(12) United States Patent
Tokita

(10) Patent No.: US 8,670,287 B2
(45) Date of Patent: Mar. 11, 2014

(54) ULTRASOUND APPARATUS

(75) Inventor: Toshinobu Tokita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 705 days.

(21) Appl. No.: 12/990,482

(22) PCT Filed: Jun. 17, 2009

(86) PCT No.: PCT/JP2009/061433
§ 371 (c)(1),
(2), (4) Date: Oct. 29, 2010

(87) PCT Pub. No.: WO2009/157459
PCT Pub. Date: Dec. 30, 2009

(65) Prior Publication Data
US 2011/0044133 A1    Feb. 24, 2011

(30) Foreign Application Priority Data

Jun. 23, 2008  (JP) ................. 2008-163641
Apr. 13, 2009  (JP) ................. 2009-097224

(51) Int. Cl.
*G01S 7/52* (2006.01)
(52) U.S. Cl.
USPC .......................... 367/11; 367/905
(58) Field of Classification Search
USPC .................................. 367/87, 905
See application file for complete search history.

(56) References Cited

U.S. PATENT DOCUMENTS

| | | | |
|---|---|---|---|
| 6,629,929 B1 | 10/2003 | Jago et al. | |
| 6,726,631 B2 | 4/2004 | Hatangadi et al. | |
| 2001/0043510 A1 | 11/2001 | Yanagida et al. | |
| 2005/0033165 A1 | 2/2005 | Ustuner et al. | |
| 2010/0163129 A1 | 7/2010 | Tokita et al. | |
| 2011/0044133 A1 * | 2/2011 | Tokita | 367/87 |

FOREIGN PATENT DOCUMENTS

| | | |
|---|---|---|
| CN | 1568230 A | 1/2005 |
| CN | 1708698 A | 12/2005 |
| EP | 0898175 A1 | 2/1999 |
| JP | 2000-229080 A | 8/2000 |
| JP | 2006-217943 A | 8/2006 |

OTHER PUBLICATIONS

Chinese Office Action dated, Aug. 31, 2012 in corresponding Chinese Patent Application No. 200980122896.8.
International Preliminary Report on Patentability dated Jan. 13, 2011 in corresponding PCT Patent Application No. PCT/JP2009/061433.

* cited by examiner

*Primary Examiner* — Daniel Pihulic
(74) *Attorney, Agent, or Firm* — Fitzpatrick, Cella, Harper & Scinto

(57) ABSTRACT

A storage unit (106) stores pieces of information regarding intensities of ultrasound waves detected by multiple oscillators (101) in time series. The multiple oscillators (101) receives an ultrasound wave reflected on an object (107), to which a second ultrasound wave (108) generated by an ultrasound probe (102) is focused, in order from an oscillator closest to the object (107). The second ultrasound wave (108) is transmitted in a direction different from that of a first ultrasound wave (103). Information regarding an intensity of the ultrasound wave reflected on the object (107), which is obtained by storing in the storage unit (106) in order from the oscillator closest to the object (107), is obtained. This information is subtracted from the pieces of information stored in the storage unit (106). Thus, a received signal from a side lobe is extracted to be subtracted from a whole received signal.

8 Claims, 13 Drawing Sheets

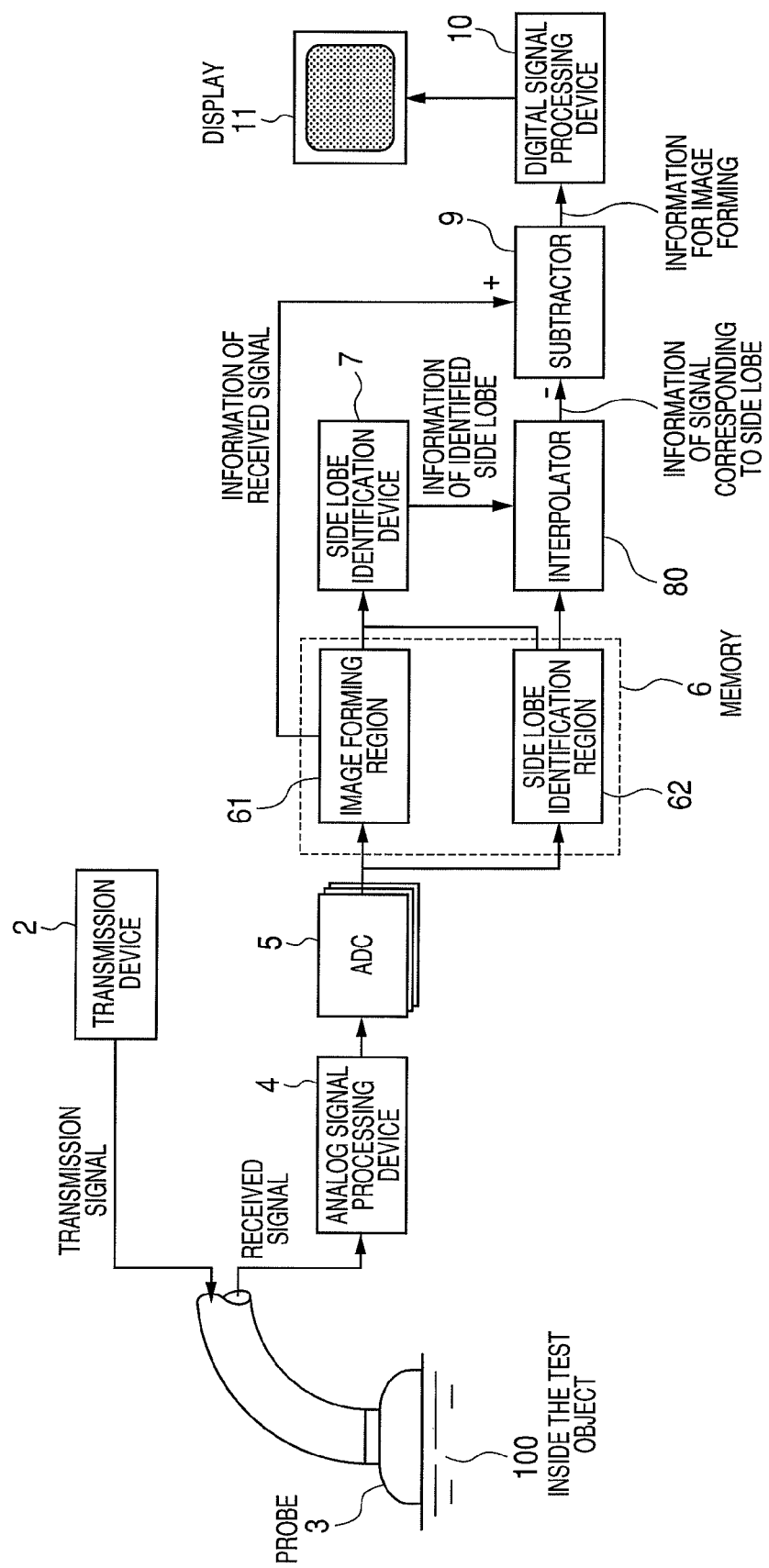

ULTRASOUND APPARATUS

TECHNICAL FIELD

The present invention relates to an ultrasound apparatus which transmits and receives an ultrasound wave to and from a test object to display a tissue image of the inside of the test object.

BACKGROUND ART

In an ultrasound apparatus, presence of an artifact (virtual image) causes a reduction in resolution ability, which is known to be a serious problem to be solved. One of the causes of artifact generation is a side lobe (second main pole or subpole). The side lobe is an ultrasound wave radiated in another direction than a transmission direction of a main lobe of the ultrasound wave that has been radiated from an ultrasound probe. Types of side lobes include a grating lobe.

In the case of an ultrasound probe which linearly includes probes (linear probe), a direction of side lobe generation is determined by spacing between devices. For example, when an array of probes is designed based on a device pitch (space between devices) having a length equal to a wavelength of an ultrasound wave to be generated, a side lobe is formed in a direction tilted by 90° with respect to the transmission direction of the main lobe. In this case, when the main lobe is transmitted and received on a perpendicular plane of the linear probe, generation of artifacts can be reduced because of the forming direction of the side lobe tilted by 90° with respect to the transmission direction of the main lobe.

Similarly, even in the case of probes other than the linear probe, setting device pitches approximately equal to the above-mentioned wavelength enables a reduction of artifacts.

Generally, in designing of ultrasound probes, resolution abilities of a depth direction (transmission direction of ultrasound) and a direction perpendicular to the depth direction take priority, because of the importance in improving of resolution of a displayed image.

In designing, in view of productivity of ultrasound probes and sizes of transmission/reception circuits, it is difficult to shorten device pitches to approximately equal to the wavelength. Therefore, in such an ultrasound probe, a side lobe is generated in a direction of 90° or less with respect to the transmission direction of the main lobe.

Japanese Patent Application Laid-Open No. 2000-229080 discusses a method for suppressing artifacts generated by side lobes. Referring to FIG. 12, Japanese Patent Application Laid-Open No. 2000-229080 is described as follows.

Multiple oscillators that receive ultrasound are divided into two groups of A and B. Each oscillator transmits an ultrasound wave to receive a reflection wave from a test object. Signals received by the oscillators of the groups A and B are sent to reception circuits 400A and 400B, respectively. The reception circuits 400A and 400B carry out phase rectifying addition for the signals. Then, an adder 410 adds together the signals which have been subjected to the phase rectifying addition.

A phase reverser 420 reverses a phase of the signal received by the oscillators of the group A. An adder 411 adds together the phase-reversed signal and the signal received by the oscillators of the group B.

An absolute value calculator 430 calculates an absolute value of the signal added together by the adder 410 (detection processing) to output the absolute value as a whole received signal. An absolute value calculator 431 calculates an absolute value of the signal added together by the adder 411 (detection processing) to output the absolute value as a signal of an ultrasound wave from a transmission direction of a side lobe. Adding together the phase-reversed signal of one signal from the phase reverser 420 and the other signal enables extraction of signals different between the groups A and B. The signal corresponds to the signal of the ultrasound wave from the transmission direction of the side lobe.

When a subtracter 440 subtracts the signal of the ultrasound wave reflected from the direction of the side lobe from the whole received signal, a signal of an ultrasound wave from a transmission direction of a main lobe is left. Thus, an image having no artifacts can be displayed.

However, the unit for subtracting the side lobe discussed in Japanese Patent Application Laid-Open No. 2000-229080 is effective only when the inside of the test object is symmetrical with respect to the direction of the ultrasound transmitted/received by the oscillators of the groups A and B.

Generally, there is a sound-velocity distribution where the inside of the test object is asymmetrical with respect to a transmission/reception direction of an ultrasound wave. Thus, for signals obtained when refracted ultrasound waves are received by the oscillators, phases are different (asymmetrical) between the signals received by the groups A and B. As a result, even when a phase of the signal of one group is reversed to be added, an output signal cannot always be regarded as a signal corresponding to a side lobe.

DISCLOSURE OF THE INVENTION

The present invention has been made in view of the aforementioned problems of the background art.

The present invention is directed to an ultrasound apparatus which can reduce artifacts to improve resolution by extracting a received signal from a transmission direction of a side lobe and subtracting the received signal from a whole received signal even when the inside of a test object is complex and there is a sound-velocity distribution.

According to a first aspect of the present invention, there is provided an ultrasound apparatus comprising:

an ultrasound probe which comprises multiple oscillators for generating and detecting an ultrasound wave;

a control unit for controlling the ultrasound probe to generate an ultrasound wave as a main lobe and to detect an ultrasound wave from a focusing position in a direction of the main lobe; and a storage unit for storing intensities of ultrasound waves detected by the multiple oscillators as time-series signals, wherein:

among the multiple oscillators, oscillators included within a distance of $d_0 \cdot \tan \theta$ or less from a center oscillator of an aperture are selected as a reception aperture, where, with respect to a direction perpendicular to the aperture of the ultrasound apparatus, $d_0$ is a distance from the aperture to an object positioned in a direction of a side lobe, and $\theta$ is an angle between the main lobe and the side lobe;

among the time-series signals stored in the storage unit, a signal received in order from an end of the reception aperture to another end is identified as a signal reflected from the object positioned in the direction of the side lobe; and the identified signal from the side lobe is subtracted from the time-series signals stored in the storage unit.

According to a second aspect of the present invention, there is provided an ultrasound apparatus comprising:

an ultrasound probe which comprises multiple oscillators for generating and detecting an ultrasound wave;

a control unit for generating an ultrasound wave by focusing the multiple oscillators on a focal point so that the ultrasound probe generates a first ultrasound wave; and a storage unit for storing pieces of information regarding ultrasound intensities detected by the multiple oscillators in time series, wherein:

when the ultrasound probe generates a main lobe in a direction of angle α with respect to a direction perpendicular to the multiple oscillators, by using a received signal stored in the storage unit, a difference between a distance from an object to one end of the multiple oscillators and a distance from the object to another end of the multiple oscillators is calculated;

when the calculated difference exceeds a reference width given based on the angle α, the received signal is identified as a signal from a direction of a side lobe; and the identified signal from the direction of the side lobe is subtracted from the received signal stored in the storage unit.

According to a third aspect of the present invention, there is provided an ultrasound apparatus comprising:

an ultrasound probe which comprises multiple oscillators for generating and detecting an ultrasound wave;

a control unit for generating an ultrasound wave by focusing the multiple oscillators on a focal point so that the ultrasound probe generates a first ultrasound wave; and a storage unit for storing pieces of information regarding ultrasound intensities detected by the multiple oscillators in time series, wherein:

when the ultrasound probe generates a main lobe in a direction of an angle α with respect to a direction perpendicular to the multiple oscillators, the multiple oscillators receives, one of an ultrasound wave obtained when a second ultrasound wave generated in a direction different from the direction of the first ultrasound wave is reflected on an object, in order from one of the multiple oscillators closest to the object, and an ultrasound wave reflected on the focal point, in order from one of the multiple oscillators closest to the focal point;

among the multiple oscillators, a distance from one of the multiple oscillators at an end, to one of the focal point and to the object is obtained; and using the distance, information of the ultrasound wave reflected on one of the focal point and the object is recognized.

According to a fourth aspect of the present invention, there is provided an ultrasound apparatus comprising:

an ultrasound probe which comprises multiple oscillators for generating and detecting an ultrasound wave;

a control unit for controlling the ultrasound probe to generate an ultrasound wave as a main lobe and to detect an ultrasound wave from a focusing position in a direction of the main lobe; and a storage unit for storing intensities of ultrasound waves detected by the multiple oscillators as time-series signals, wherein:

among the multiple oscillators, oscillators included within a distance of $d_0 \cdot \tan \theta$ or less from a center oscillator of an aperture are selected as a reception aperture, where, with respect to a direction perpendicular to the aperture of the ultrasound probe, $d_0$ is a distance from the aperture to an object positioned in a direction of a side lobe, and $\theta$ is an angle between the main lobe and the side lobe;

among the stored time-series signals, a signal received in order from an end of the reception aperture to another end is identified as a signal reflected from the object positioned in the direction of the side lobe; and the identified signal from the side lobe is subtracted from the stored time-series signals.

According to a fifth aspect of the present invention, there is provided an ultrasound apparatus comprising:

an ultrasound probe which comprises multiple oscillators for generating and detecting an ultrasound wave;

a control unit for generating an ultrasound wave by focusing the multiple oscillators on a focal point so that the ultrasound probe generates a first ultrasound wave; and a storage unit for storing pieces of information regarding ultrasound intensities detected by the multiple oscillators in time series, wherein:

when the ultrasound probe generates the main lobe in a direction of an angle α with respect to a direction perpendicular to the multiple oscillators, calculating a difference between a distance from an object to one end of the multiple oscillators and a distance from the object to another end of the multiple oscillators by using a stored received signal;

when the calculated difference exceeds a reference width given based on the angle α, identifying the received signal as a signal from a direction of the side lobe; and subtracting the identified signal from the direction of the side lobe from the stored received signals.

Subtracting information of a signal received from the side lobe direction from information of the received signal enables highly accurate generation of information of a signal received from the main lobe direction. As a result, the present invention provides an ultrasound apparatus which can display an artifact-reduced image by subtraction of the information of the received signal from the side lobe direction.

Further features of the present invention become apparent from the following description of exemplary embodiments with reference to the attached drawings.

BRIEF DESCRIPTION OF THE DRAWINGS

FIG. 10 is a schematic diagram illustrating an ultrasound apparatus according to a third embodiment.

BEST MODE FOR CARRYING OUT THE INVENTION

Figure 1:
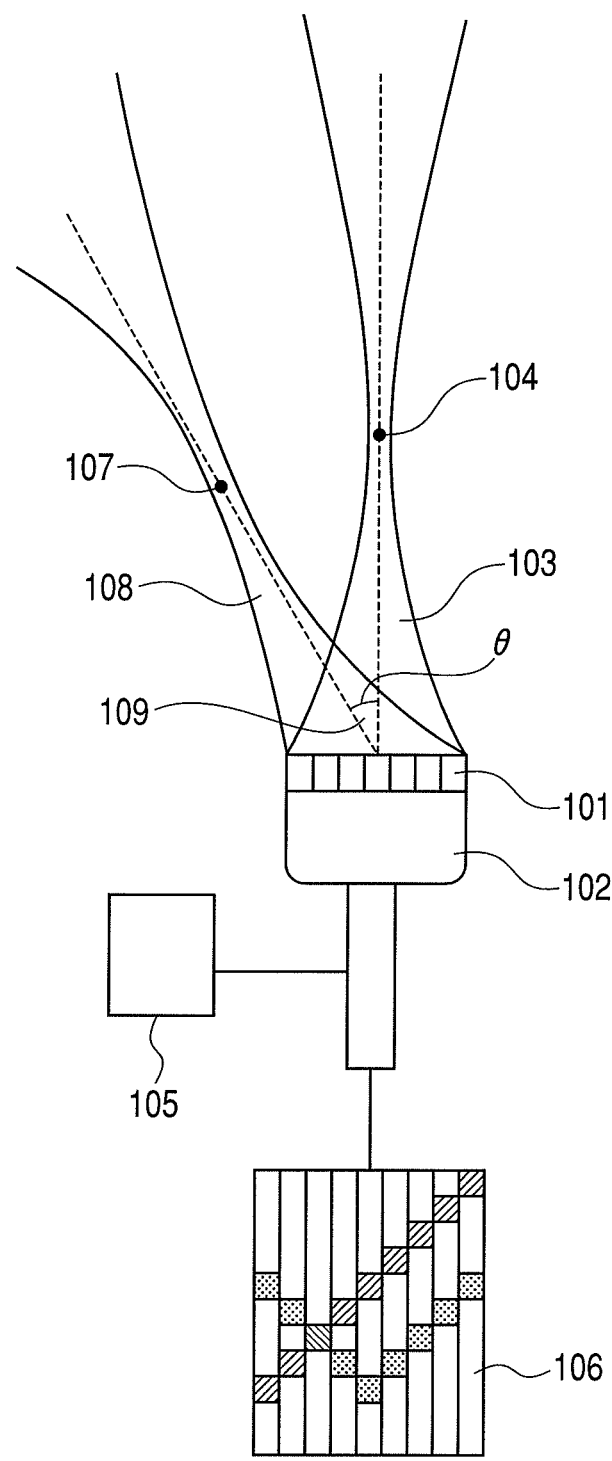
FIG. 1 is a schematic diagram illustrating an ultrasound apparatus according to an embodiment mode of the present invention.

Hereinafter, referring to FIG. 1, an ultrasound apparatus according to an embodiment mode of the present invention is described as follows.

An ultrasound probe 102 includes multiple oscillators 101 for generating and detecting an ultrasound wave. A part from which the multiple oscillators 101 generate an ultrasound wave is called an aperture, a transmission/reception aperture or a reception aperture.

A control unit 105 generates an ultrasound wave by focusing the multiple oscillators 101 on a focal point 104 so that the ultrasound probe 102 can generate a first ultrasound wave 103. To generate an ultrasound wave on the focal point 104, a method (electronic focusing) is available which sequentially delays timings of driving the oscillators by using a delay circuit when applying pulse voltages to the oscillators. Changing a difference in delay time between the oscillators enables changing of a position of a focus point in a depth direction (transmission direction of ultrasound wave).

The control unit 105 controls the ultrasound probe 102 to generate an ultrasound wave as a main lobe (first ultrasound wave 103) in a predetermined direction. Thus, the control unit 105 can control a transmission timing of an ultrasound wave transmitted from the multiple oscillators 101 of the ultrasound probe 102. The control unit 105 controls the ultrasound probe 102 to detect an ultrasound wave from a focusing position (focal point 104, or predetermined position) in a direction of the main lobe 103. Thus, the control unit 105 can control a reception timing of an ultrasound wave received by the multiple oscillators 101 of the ultrasound probe 102.

A storage unit 106 stores information regarding intensities of an ultrasound wave detected by the multiple oscillators 101 in time series (or stores intensities of the ultrasound wave as time-series signals). The storage unit 106 is, for example, a memory.

The multiple oscillators 101 receives an ultrasound wave which is a reflection of a second ultrasound wave 108 generated by the ultrasound probe 102 on an object 107 (or reflecting object, scattering object or scattering point) in order from the oscillator closest to the object 107. The second ultrasound wave 108 is transmitted in a direction different from that of the first ultrasound wave 103. The first ultrasound wave may be a main lobe, and the second ultrasound wave may be a side lobe, but not necessarily so. The object 107 is a set of scattering points.

Information regarding intensities of the ultrasound wave reflected on the object 107, which has been obtained by storing the intensities in order from the oscillator closest to the object 107 is subtracted from information stored in the storage unit 106.

(Aperture Control: Selection of Oscillators for Detection)

Referring to FIG. 1, an ultrasound apparatus according to another embodiment mode of the present invention is described as follows.

Aperture control is preferably so performed as to select multiple oscillators (e.g., FIG. 6A) for detecting an ultrasound wave which is a reflection of the side lobe (second ultrasound wave 108) on the object 107.

Aperture control is preferably so performed as to select oscillators included in a distance of $d_0 \cdot \tan \theta$ (or equal to the distance or less) from a center of the multiple oscillators 101. In this case, $d_0$ represents a distance of the object 107 from the center of the multiple oscillators 101 with respect to a depth direction of the inside of a test object (or position of the object 107 with a depth direction being a coordinate axis) (refer to FIG. 5A), and $\theta$ represents an angle 109 between the main lobe (first ultrasound wave 103) and the side lobe (second ultrasound wave 108).

Oscillators are selected from the multiple oscillators 101 of the ultrasound probe 102 such that an oscillator at an end is the closest to the object 107. The ultrasound wave is detected by using the multiple selected oscillators.

Based on ultrasound detection order of the multiple selected oscillators, a signal stored in the storage unit 106 is certified to be information regarding intensities of an ultrasound wave reflected on the object 107.

The ultrasound detected by the selected oscillators in order from one end to the other end among the multiple selected oscillators can be certified to be information regarding intensities of the ultrasound wave reflected on the object 107.

Details are described below with reference to embodiments.

(Generation of First Ultrasound Wave in Direction of Angle α)

Figure 2:
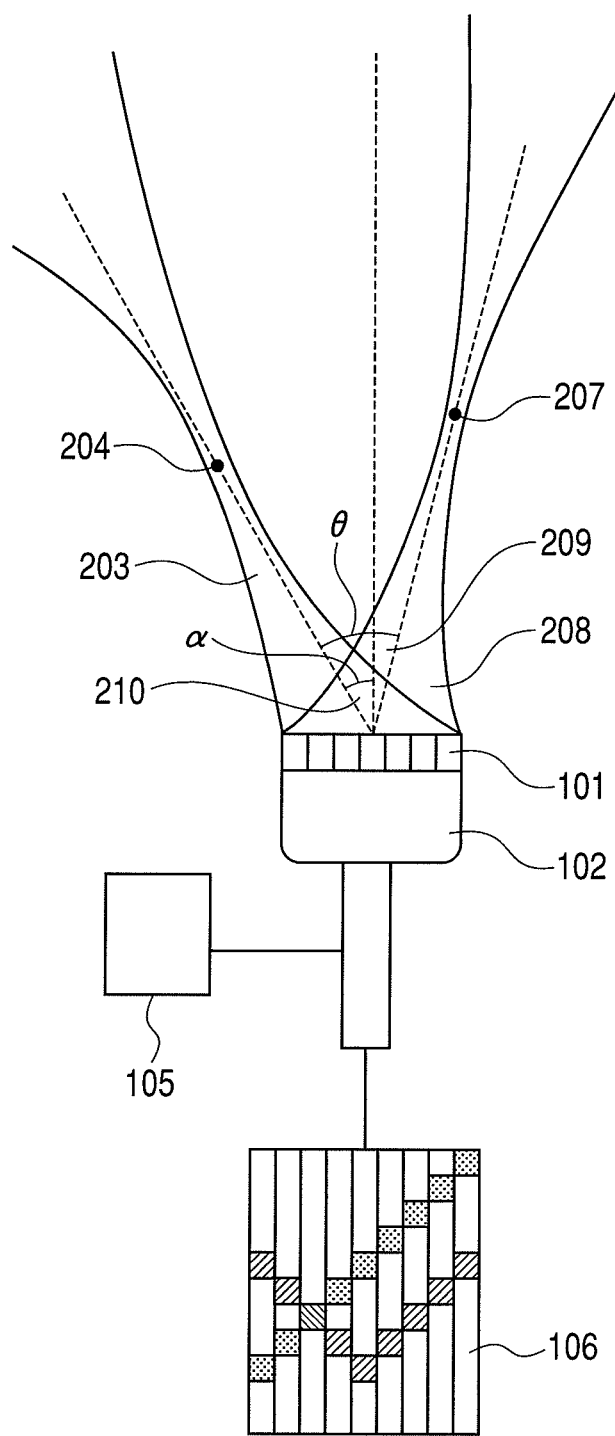
FIG. 2 is a schematic diagram illustrating an ultrasound apparatus according to another embodiment mode of the present invention.

Referring to FIG. 2, an ultrasound apparatus according to another embodiment mode of the present invention is described as follows.

The ultrasound probe 102 generates the main lobe (first ultrasound wave 203) in a direction where an angle 210 from a direction perpendicular to the multiple oscillators 101 is α.

The multiple oscillators 101 receive an ultrasound wave reflected on an object 207 in order from the oscillator closest to the object 207, or receive an ultrasound wave reflected on a focal point 204 in order from the oscillator closest to the focal point 204. A second ultrasound wave 208 generated by the ultrasound probe is generated in a direction different from that of the first ultrasound wave 203 generated by the ultrasound probe 102. The object 207 is a set of scattering points.

A distance from an oscillator at an end among the multiple oscillators 101 to the focal point 204 or the object 207 is calculated. The distance calculation is described below in detail with reference to embodiments.

The use of the distance enables recognition of information from an ultrasound wave reflected on the focal point or the object.

(Method of Controlling Ultrasound Apparatus)

Referring to FIG. 1, a method of controlling the ultrasound apparatus of the another embodiment mode of the present invention is described as follows. The ultrasound apparatus includes an ultrasound apparatus equipped with multiple oscillators for generating and detecting an ultrasound wave.

A first ultrasound wave 103 is generated focusing on the focal point 104.

For each of the multiple oscillators 101, information regarding intensities of an ultrasound wave detected by the multiple oscillators 101 is stored in time series.

A time period after a second ultrasound wave 108 is generated in a direction different from that of the first ultrasound wave 103 until the second ultrasound wave 108 that has been reflected on the object 107 is detected by the multiple oscillators 101 is calculated.

The intensity of the ultrasound wave reflected on the object 107, which has been detected by each of the multiple oscillators 101, is obtained by using information stored in the time period.

The intensity of the ultrasound wave reflected on the object 107 is subtracted from the information stored in time series.

EMBODIMENTS

First Embodiment

Figure 3:
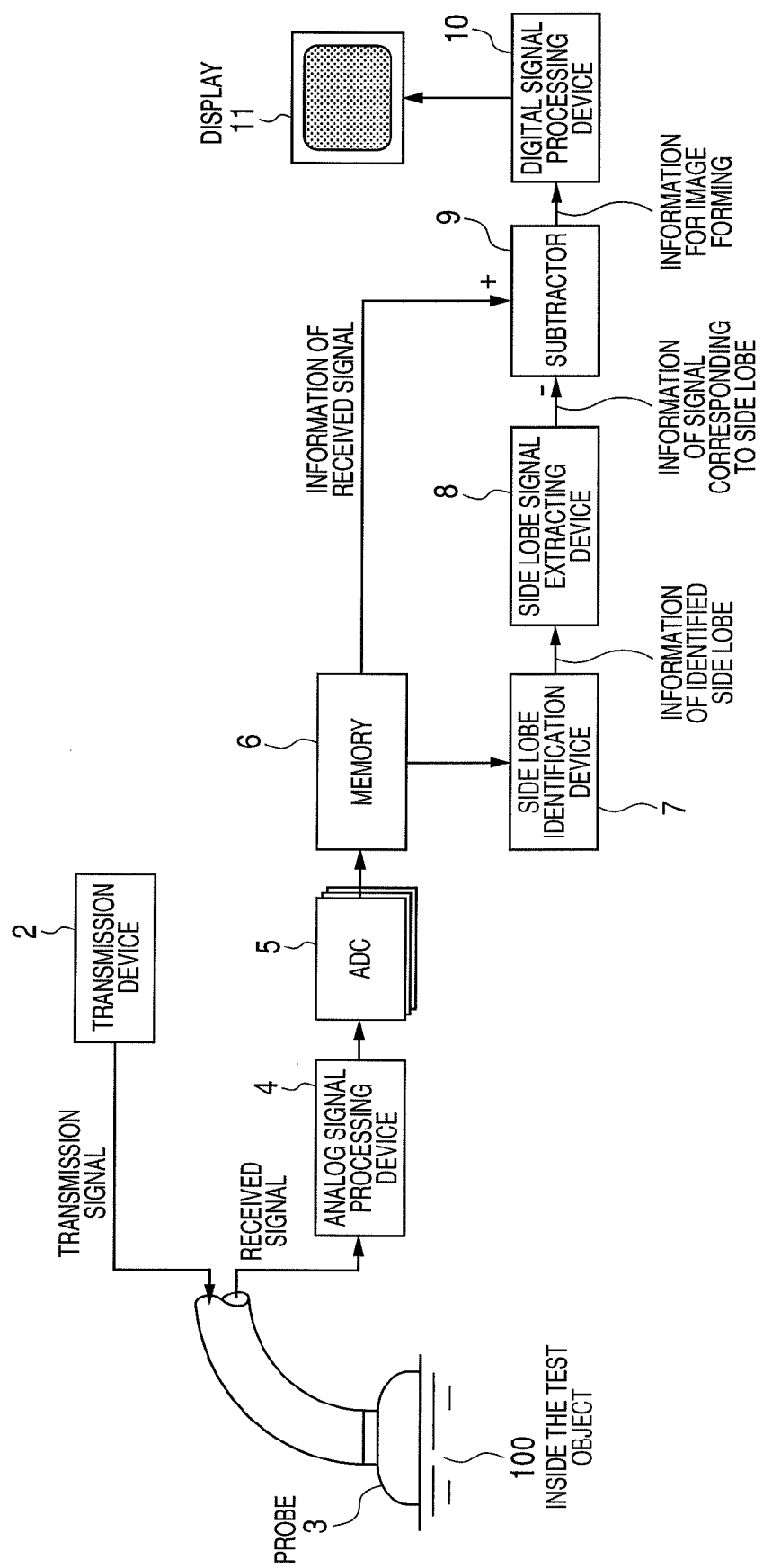
FIG. 3 is a schematic diagram illustrating an ultrasound apparatus according to first and second embodiments.

Linear Scanning or Case in which Ultrasound Wave is Transmitted in Probe Direction FIG. 3 is a schematic diagram illustrating a configuration of an ultrasound apparatus according to a first embodiment.

A transmission device 2 performs processing such as transmission beam forming to transmit an ultrasound wave. A probe 3 transmits and receives an ultrasound wave based on a transmission signal from the transmission device 2. An analog signal processing device 4 includes a band-pass filter, a low noise amplifier, and a variable gain controller, and performs filter processing or amplification. An A/D converter (ADC) 5 converts an analog signal processed by the analog signal processing device 4 into a digital signal. A memory 6 stores the digital signals in time series. A side lobe identification device 7 identifies a side lobe. A side lobe signal extracting device 8 extracts a signal from the identified side lobe from the memory 6. A subtracter 9 subtracts information of the signal corresponding to the side lobe from an image forming signal. A digital signal processing device 10 includes a memory (FIFO), a reception beam forming unit (signal processing unit), and an image processing unit, and performs signal processing such as phase rectifying conversion, detection, or logarithmic compression, and image processing. A display 11 displays an ultrasound image.

Next, a signal flow is described as follows.

The transmission device 2 transmits a transmission signal to each device of the probe 3, and sends an ultrasound wave to a test object 100. The device of the probe 3 receives an ultrasound wave reflected on the test object 100, and the analog signal processing device 4 performs filter processing or amplification for the received signal.

The ADC 5 digitizes an output from the analog signal processing device 4 to store the output in the memory 6. In a conventional ultrasonograph, a digital signal processing device 10 performs phase rectifying addition for a signal digitized by an ADC 5 via a FIFO, and performs detection, signal processing such as logarithmic compression, and image processing, to display an ultrasound image on a display 11. On the other hand, in this embodiment, the memory 6 stores raw signals digitized by the ADC in time series. The memory 6 needs a capacity to identify a signal from a side lobe, to obtain information of the signal corresponding to the side lobe, and to subtract the information from information of the received signal. Thus, the memory 6 advisably stores received signals corresponding to transmission/reception of at least one scanning, and preferably stores signals of several frames.

The side lobe identification device 7 identifies a signal corresponding to a signal from the side lobe among time-series data corresponding to the devices in the memory 6. Information of the signal corresponding to the side lobe is obtained by the side lobe signal extracting device 8 based on side lobe identification information, and the information of the signal corresponding to the side lobe is sent to the subtracter 9. The subtracter 9 receives information of the received signal of a reception aperture, which is necessary for image forming, and subtracts the information of the signal corresponding to the side lobe from the information of the received signal to obtain information for image forming corresponding to a signal from a main lobe.

With the aforementioned steps set as one scanning, scanning is carried out by shifting a position of a transmission/reception aperture when the probe 3 is a linear probe. When the probe 3 is a sector probe, scanning is carried out by shifting a scan angle of transmission/reception. In this way, information for image forming for displaying an area or a volume is obtained. Performing signal processing such as phase rectifying conversion, detection or logarithmic compression, and image processing for the information for image forming at the digital signal processing device 10 enables displaying of an artifact-reduced ultrasound image on the display 11.

Some of the functions of the digital signal processing device 10, for example, part of signal processing such as detection, may be set between the ADC 5 and the memory 6. FIG. 1 illustrates the system configuration based on the assumption of B mode displaying. However, a processing function for realizing other modes such as a doppler may be provided.

Figure 4A:
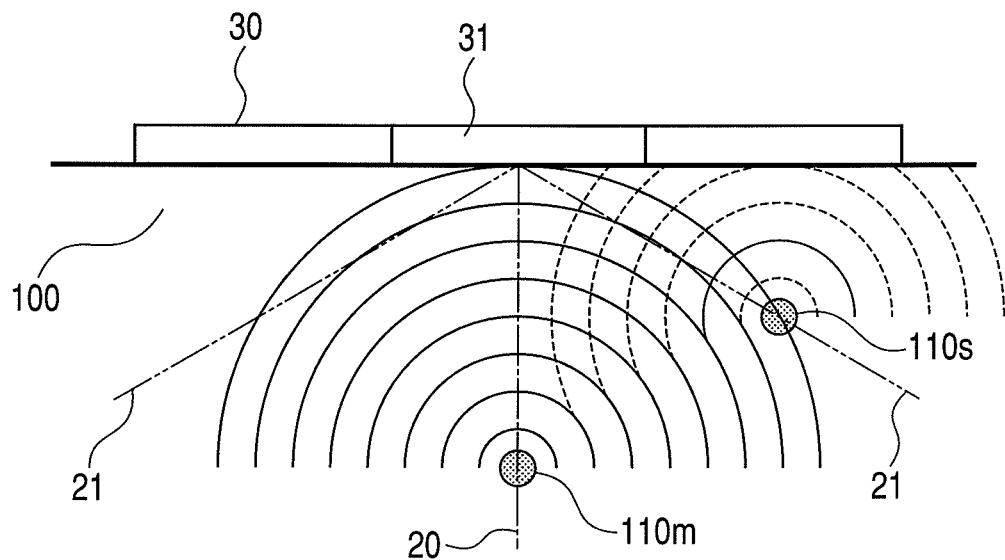
FIG. 4A is a schematic diagram illustrating a linear probe.

Next, referring to FIGS. 4A and 4B, signal processing from the memory 6 to the side lobe identification device 7 and the subtracter 9 is described as follows. FIG. 4A illustrates linear scanning, which receives signals 20 and 21 from main and side lobes.

A transmission/reception aperture 31 includes devices (oscillators) of the linear probe for transmitting/receiving beams by electronic scanning.

A beam transmitted from the transmission/reception aperture 31 causes transmission of the main lobe 20 in a direction perpendicular to the linear probe 3, thereby generating the side lobe 21 in a predetermined angle direction from the main lobe 20. If there are scattering points 110m and 110s at the same distances from a center of the transmission/reception aperture 31 in the direction perpendicular to the probe 3 and the direction of the side lobe 21, a reflection wave from the direction of the main lobe 20 is received from the center of the transmission/reception aperture 31. A reflection wave from the direction of the side lobe 21 is received from the outside of the transmission/reception aperture 31 but is not received from the transmission/reception aperture 31.

In FIG. 4A, solid lines indicate reflection waves from the direction of the main lobe 20 (A-1 and A-2), and broken lines indicate reflection waves from the direction of the side lobe 21 (B-1 and B-2).

Figure 4B:
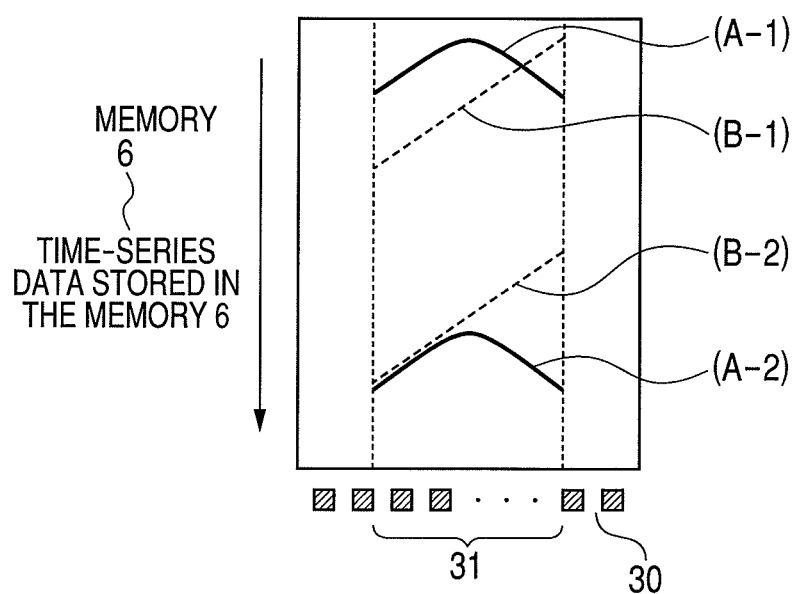
FIG. 4B is a schematic diagram illustrating information stored in a memory.

FIG. 4B is a schematic diagram illustrating a status where signals digitized corresponding to the devices 30 are stored in time series in the memory 6. First, a case where the memory 6 stores received signals like (A-1) and (B-1) when the scattering points 110m and 110s are at the same distances from the transmission/reception aperture 31 is as follows. The side lobe identification device 7 identifies a signal (B-1) received from the outside of the transmission/reception aperture 31 to move toward the center of the transmission/reception aperture 31 as signal information from the direction of the side lobe 21. The side lobe signal extracting device 8 can obtain information of a signal corresponding to a side lobe. Subtracting the information of the signal corresponding to the side lobe from information of the whole received signal received at the transmission/reception aperture 31 leaves signal information from the direction of the main lobe 20. A case where the memory 6 stores received signals like (A-2) and (B-2) of FIG. 4B is as follows. As in the case of the above, the side lobe identification device 7 identifies a signal (B-2) received from the outside of the transmission/reception aperture 31 to move toward the center of the transmission/reception aperture 31 as signal information from the direction of the side lobe 21.

Parts of the pieces of information (A-1) and (A-2) received from the main lobe direction overlap the pieces of information (B-1) and (B-2) received from the side lobe direction respectively. Thus, overlapped information is interpolated from nonoverlapped information of the signal corresponding to the side lobe to generate information of the signal corresponding to the side lobe. The information of the signal corresponding to the side lobe is subtracted from information of the whole received signal received at the transmission/reception aperture 31 to leave signal information from the direction of the main lobe 20.

The method described above enables obtaining of information of the signal corresponding to a signal from the main lobe 20.

Figure 5A:
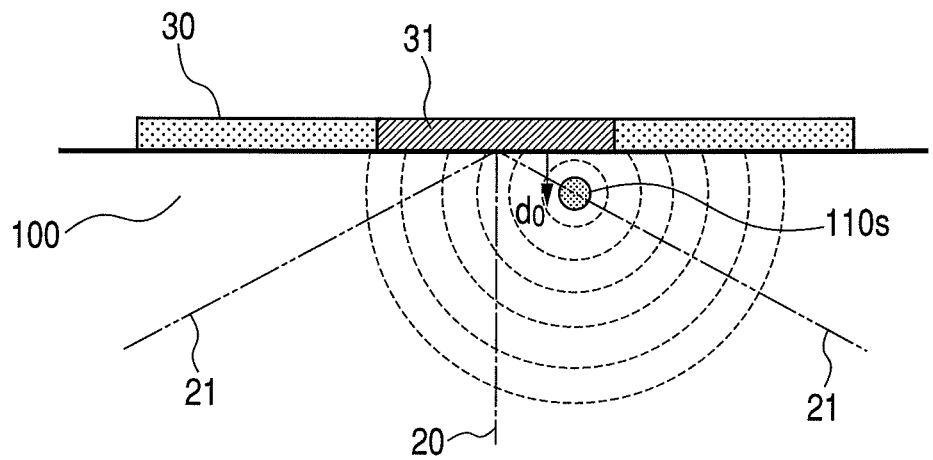
FIG. 5A is a schematic diagram illustrating a relationship between an aperture and a scattering point.

When the scattering point 110s in the direction of the side lobe 21 is sufficiently close to the device array 30 as illustrated in FIG. 5A, the signal is first received in the inside of the transmission/reception aperture 31. Thus, the side lobe identification device 7 cannot identify a reflection wave from the direction of the side lobe 21 as signal information from the direction of the side lobe 21.

In such a case, an aperture control unit is disposed in the ultrasound apparatus to control an aperture. That is, according to a depth of the scattering point 110, an aperture for receiving a reflection wave at least during reception is selected from among the transmission/reception apertures 31. Referring to a flowchart of FIG. 5B, an identification method for a signal from a direction of a side lobe where aperture control has been carried out is as follows.

First, in Step b1, pieces of time-series data in the memory are referred to. In Step b2, whether a distance $d_0$ in a depth direction between the aperture and the scattering point 110 is equal to $cT/(1+1/\cos\theta)$ is determined. In this case, c is a sound velocity inside the test object 100, T is a time period from transmission of the device of the aperture center through reflection on the scattering point 110 to reception of the device closest to the scattering point, and $\theta$ is an angle between the main lobe 20 and the side lobe 21, which takes a known value determined by characteristics of the ultrasound probe 102.

The expression $cT/(1+1/\cos\theta)$ used for determination is as follows.

In the case of aperture width (length of an aperture from the aperture center)$\geq d_0 \tan\theta$, a distance from the aperture center to the scattering point 110 (d of FIG. 6A) is $d_0/\cos\theta$. A distance in a depth direction between the aperture and the scattering point 110 is $d_0$. Thus, a relationship of $d_0/\cos\theta + d_0 = cT$ is established. In terms of $d_0$, this relationship is $d_0 = cT/(1+1/\cos\theta)$.

From $d_0 \neq cT/(1+1/\cos\theta)$, aperture width<$d_0 \tan\theta$ can be determined. In this case, $d_0$ cannot indicate a distance in the depth direction between the aperture and the scattering point. In other words, $d_0$ in this case is a distance between a closest device oblique to the depth direction and the scattering point. Thus, aperture width$\leq d_0 \tan\theta$ (or <$d_0 \tan\theta$) only needs to be maintained without any change (in other words, aperture control is unnecessary) (Step b4).

From $d_0 = cT/(1+1/\cos\theta)$, aperture width (length of aperture from aperture center)$\geq d_0 \tan\theta$ can be determined. Thus, whether aperture width=$d_0 \tan\theta$ or aperture width>$d_0 \tan\theta$ has to be determined (Step b3).

As described above, in Step b3, whether an aperture width (aperture length from center of aperture) during reception stored in the memory 6 is $d_0 \tan\theta$ is determined. If aperture width=$d_0 \tan\theta$ is determined, aperture width$\geq d_0 \tan\theta$ (or =$d_0 \tan\theta$) only needs to be directly maintained (in other words, aperture control is unnecessary) (Step b4).

When aperture width (length of aperture from center of aperture)$\neq d_0 \tan\theta$ is established, aperture width>$d_0 \tan\theta$ can be determined. In this case, aperture control is performed to set aperture width$\leq d_0 \tan\theta$ (Step b5).

As described above, in Step b4, the aperture width as it is or aperture width$\leq d_0 \tan\theta$ is maintained. In Step b5, aperture control is performed to set aperture width$\leq d_0 \tan\theta$.

Figure 6A:
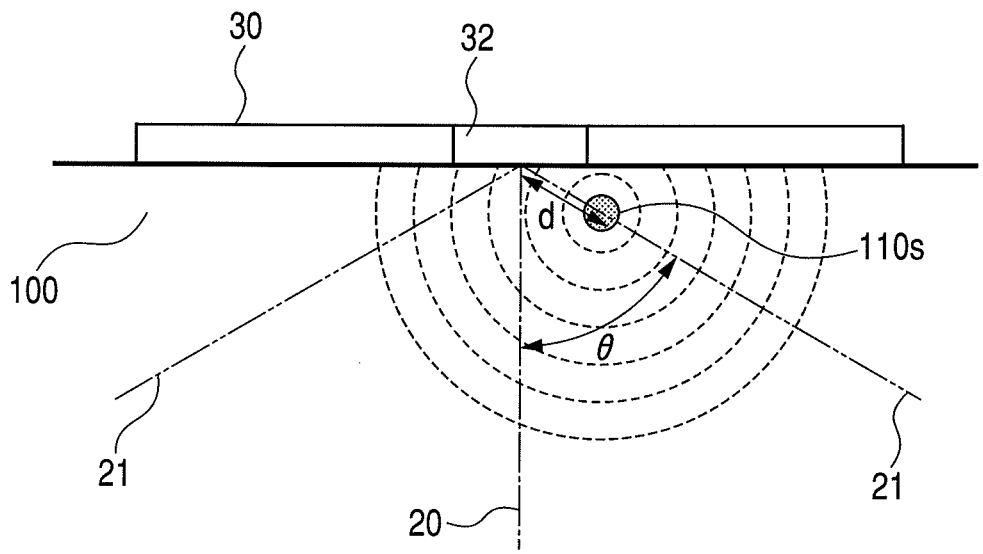
FIG. 6A is a schematic diagram illustrating aperture control.
Figure 6B:
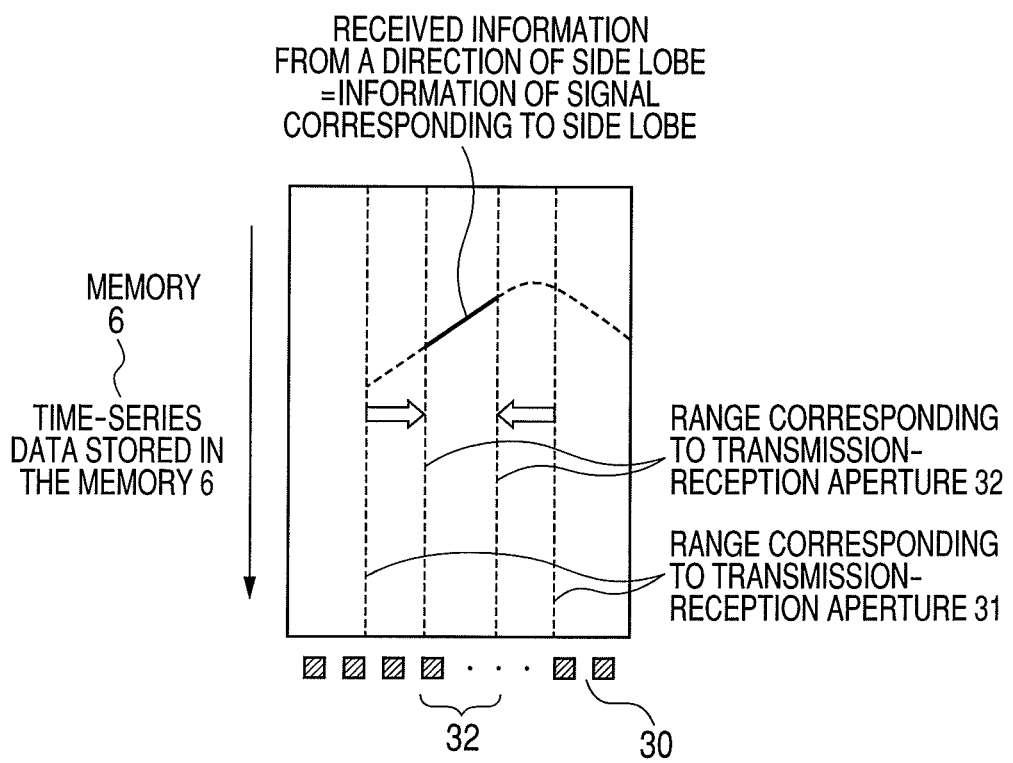
FIG. 6B is a schematic diagram illustrating information stored in the memory.

Performing aperture control according to the above-mentioned flow enables reception of a signal from the direction of the side lobe 21 from the outside of the transmission/reception aperture by narrowing the aperture width when the scattering point 110s is close to the device array 30 as illustrated in FIG. 6A. Thus, as illustrated in FIG. 6B, a signal received from the side lobe 21 can be received from a reception aperture 32, and information of the signal corresponding to the side lobe can be obtained by the method described thus far.

The transmission/reception aperture 31 only has to be narrowed at least during reception. There is no limit on aperture control during transmission. In other words, despite that the aperture has been described as the transmission/reception aperture 31, aperture devices may be different between transmission and reception.

The embodiment has been directed to the method of identifying and then extracting information of the received signal from the direction of the side lobe 21. However, these operations may be simultaneously carried out. For example, a signal received from the memory corresponding to the outside of the transmission/reception aperture 31 may be extracted in real time by identifying information of received signal from the direction of the side lobe 21. Referring to the flowchart of FIG. 5C, this method is described as follows. Steps c1 to c3 are similar to the Steps b1 to b3 described above, and thus description thereof is omitted.

First, if $d_0 \neq cT/(1+1/\cos\theta)$ is determined in Step c2, or if aperture width (length of aperture from center of aperture)=$d_0 \tan\theta$ is determined in Step c3, aperture width$\leq d_0 \tan\theta$ can be determined. In this case, in Step c4, a received signal of a receiving aperture width is selected.

If $d_0 = cT/(1+1/\cos\theta)$ is determined in Step c2, and if aperture width$\neq d_0 \tan\theta$ is determined in Step c3, aperture width>$d_0 \tan\theta$ can be determined. In this case, in Step c5, a received signal within a range of aperture width$\leq d_0 \tan\theta$ is selected.

Thus, when the scattering point 110s is close to the device array 30 as illustrated in FIG. 6A, narrowing the aperture width enables reception of a signal from the direction of the side lobe 21 from the outside of the transmission/reception aperture. Selecting the received signal from the selected aperture from among the signals received at the aperture enables extraction of the signal from the direction of the side lobe 21.

The method of identifying the information of received signal from the direction of the side lobe 21 has been directed to the signal received from the outside of the transmission/reception aperture 31, in other words, from the memory corresponding to the end thereof. However, the method is not limited to this signal. For example, a signal received from a memory corresponding to an inner device next to the end of the transmission/reception aperture 31 may be identified as information of received signal from the direction of the side lobe 21. Thus, the memory corresponding to the outside of the transmission/reception aperture 31 of the first embodiment only needs to be substantially outside.

According to the first embodiment, information of the signal corresponding to the side lobe can be identified by a simple method from the pieces of information of received signal stored in time series in the memory 6. Subtracting the information of the signal corresponding to the side lobe from the information of received signal of the transmission/reception aperture 31 enables obtaining of information for image forming corresponding to a signal from the main lobe. As a result, an artifact-reduced ultrasound image can be displayed on the display 11.

Even if there is a sound-velocity distribution inside the test object 100, the information of the signal corresponding to the side lobe can be identified, and hence a system of a highly robust ultrasonograph 1 can be configured.

Second Embodiment

Sector Scanning or when Ultrasound Wave is Transmitted in Direction of Angle α

The first embodiment has been directed to the case where the probe 3 is a linear electronic scanning system. In the second embodiment, referring to FIG. 7, a sector scanning system is described as follows. The sector scanning system scans an ultrasound beam in a fan shape. Thus, a received signal reflected from a scattering point 110m in a direction of a main lobe 20 is not always received from the vicinity of a center of a transmission/reception aperture 31.

Figure 7:
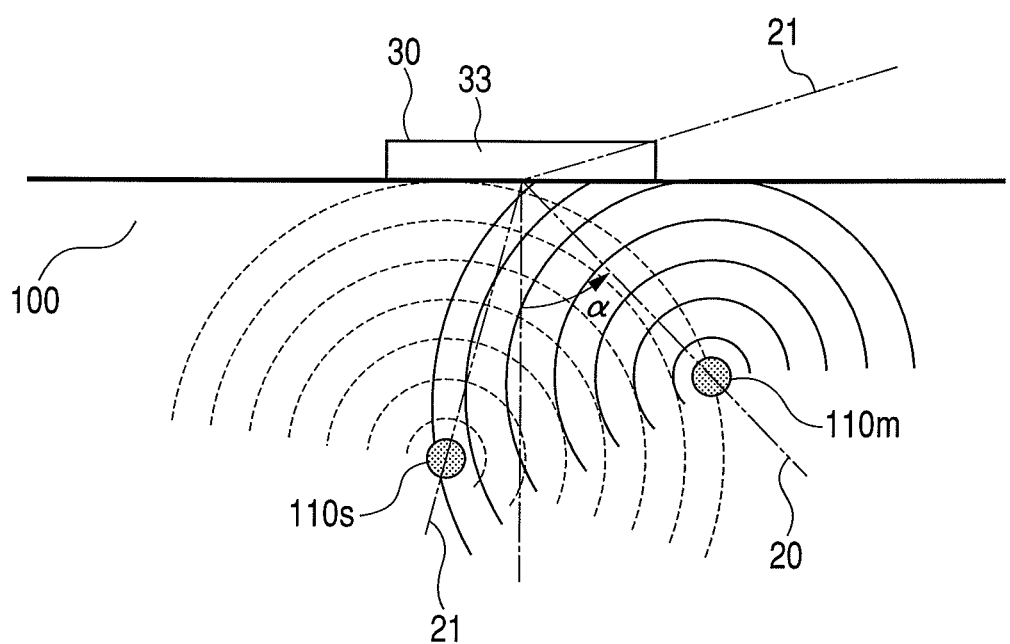
FIG. 7 is a schematic diagram illustrating sector scanning.
Figure 8A:
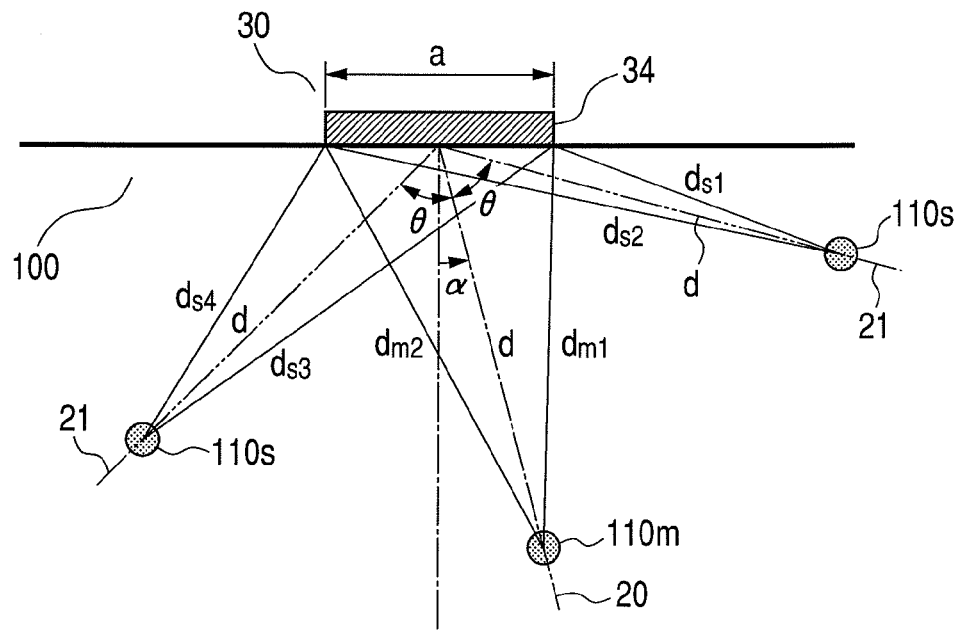
FIG. 8A is a schematic diagram illustrating identification of received information from the side lobe direction.
Figure 8B:
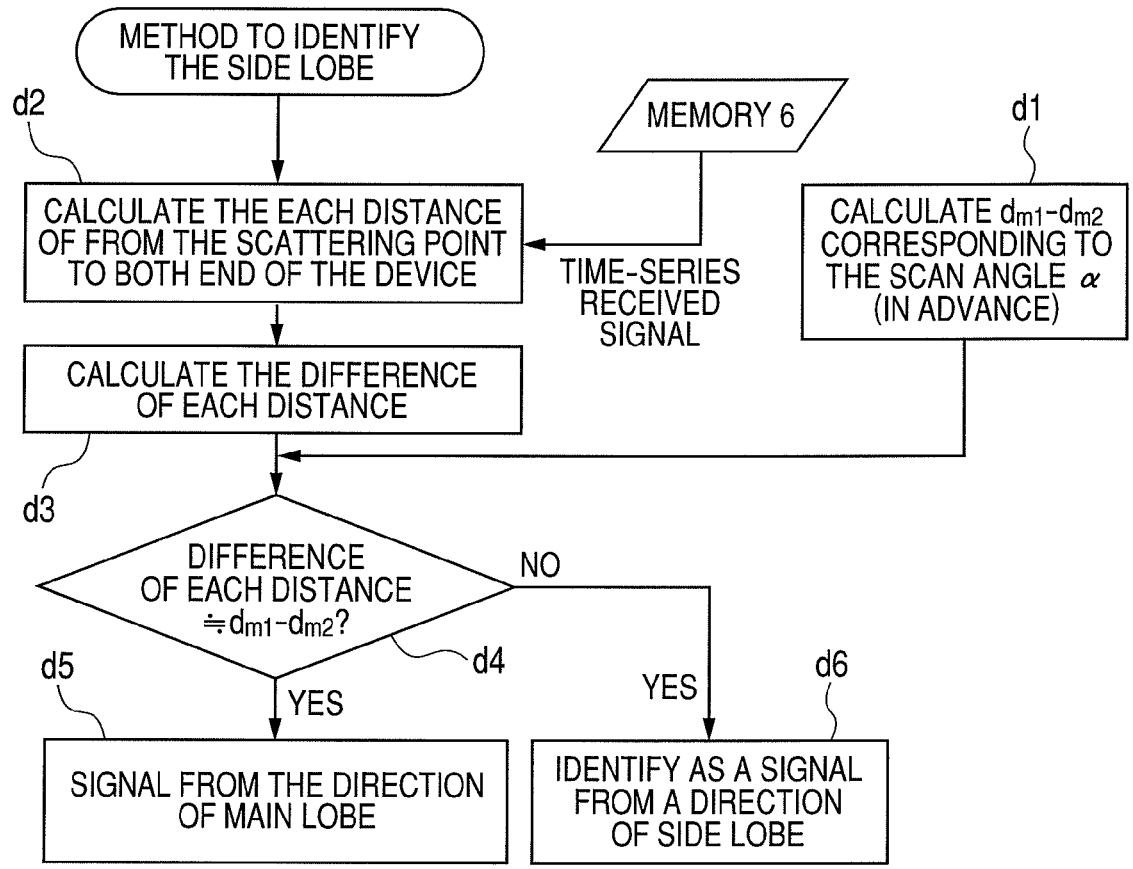
FIG. 8B is a flowchart illustrating the identification of the received information from the side lobe direction.

FIG. 7 is a schematic diagram illustrating a status of received signals from scattering points 110m and 110s when a sector scan angle α is set with respect to a direction perpendicular to a device array 30 (transmission/reception aperture 33). In FIG. 7, a received signal (solid line) from the main lobe 20 is received from the outside of the transmission/reception aperture 33, while a received signal (broken line) from a side lobe 21 is received from the inside of the transmission/reception aperture 33. Thus, in the case of the sector scanning system, if information of the signal corresponding to the side lobe 21 is to be obtained by the method of the first embodiment, information of the signal corresponding to the main lobe may be subtracted in a certain scan angle α. Referring to FIGS. 8A and 8B, a method of obtaining information of the signal corresponding to the side lobe 21 based on the sector scanning system is described as follows.

FIG. 8A illustrates an aperture width a of a transmission/reception aperture 34 and a distance d from a center of the transmission/reception aperture 34 to each scattering point 110m and 110s. The sector scan angle α is set with respect to a direction perpendicular to the transmission/reception aperture 34, and an angle θ is set between the main and side lobes 20 and 21.

When geometrically calculating distances from the scattering points 110 to both ends of the transmission/reception aperture 34, $d_{m1}$, $d_{m2}$ and $d_{s1}$ to $d_{s4}$ in the figure can be represented as follows:

$$d_{m1} = \sqrt{a^2/4 + d^2 - ad\sin\alpha}$$

$$d_{m2} = \sqrt{a^2/4 + d^2 + ad\sin\alpha}$$

$$d_{s1} = \sqrt{a^2/4 + d^2 + ad\sin(\theta+\alpha)}$$

$$d_{s2} = \sqrt{a^2/4 + d^2 - ad\sin(\theta+\alpha)}$$

$$d_{s3} = \sqrt{a^2/4 + d^2 + ad\sin(\theta-\alpha)}$$

$$d_{s4} = \sqrt{a^2/4 + d^2 - ad\sin(\theta-\alpha)}$$

(Equation 1)

The aperture width a of the transmission/reception aperture 34 is known information. The angle θ between the main and side lobes 20 and 21 is also known information unique to the probe 3. The sector scan angle α is known information determined by transmitted beam forming. The distances d from the center of the transmission/reception aperture 34 to the scattering points 110m and 110s can be calculated from a period of time T=2d/c (d: distance, c: sound velocity, and 2: round trip) from transmission to reception by the device array 30. Thus, the distances $d_{m1}$, $d_{m2}$ and $d_{s1}$ to $d_{s4}$ from the scattering points 110m and 110s to both ends of the transmission/reception aperture 34 can be determined by calculation.

Differences $d_{m1}-d_{m2}$ 901, $d_{s1}-d_{s2}$ 902, and $d_{s3}-d_{s4}$ 903 among the distances $d_{m1}$, $d_{m2}$ and $d_{s1}$ to $d_{s4}$ are determined. From those values, which of the directions of the main and side lobes 20 and 21 that a signal has been received from can be determined by using a following method: by using the distance difference $d_{m1}-d_{m2}$ of the main lobe as a reference, a received signal outside predetermined tolerance from the reference may be identified as a received signal from the direction of the side lobe 21.

Figure 9A:
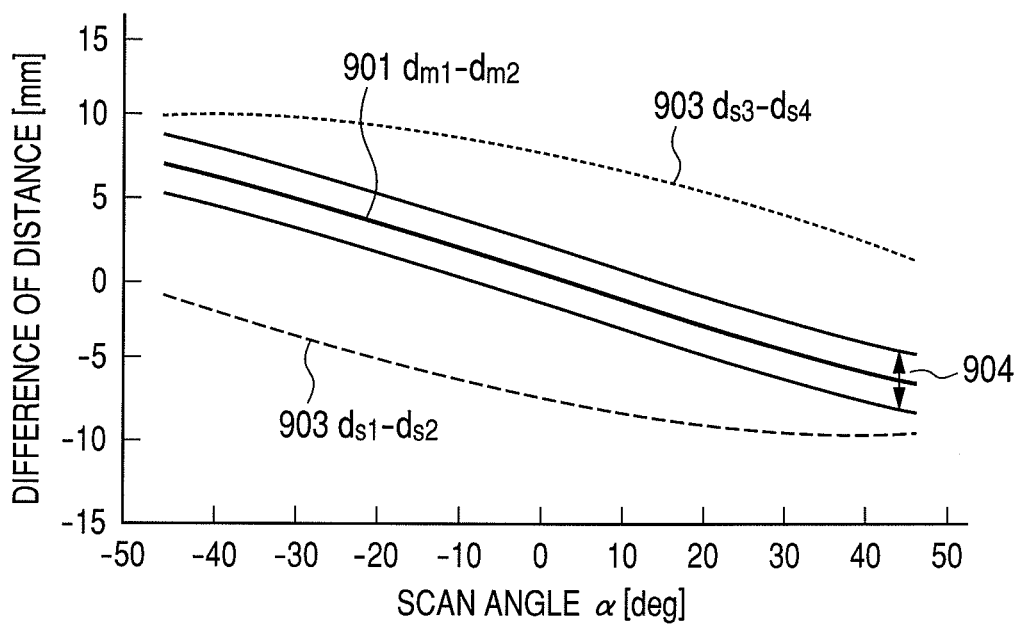
FIG. 9A is a schematic diagram illustrating data which is an example for identifying received information from the side lobe direction.

For example, the aperture width a of the transmission/reception aperture 34 is 10 mm, the angle θ between the main and side lobes 20 and 21 is 50°, and the distance d from the center of the transmission/reception aperture 34 to the scattering point 110 is 30 mm. FIG. 9A illustrates a graph where an abscissa indicates the sector scan angle α (−45°<α<45°) and an ordinate indicates the distance differences $d_{m1}-d_{m2}$ 901, $d_{s1}-d_{s2}$ 902, and $d_{s3}-d_{s4}$ 903. In FIG. 9A, using $d_{m1}-d_{m2}$ 901 as a reference, a received signal within tolerance 904 of +/− several mm (or reference width) with respect to the reference can be identified as a received signal from the direction of the main lobe. Received signals outside the tolerance, such as $d_{s1}-d_{s2}$ 902 and $d_{s3}-d_{s4}$ 903 in this embodiment, may be identified as received signals from the side lobe. Referring to a flowchart of FIG. 8B, the above-mentioned method is described as follows.

First, in Step d1, $d_{m1}-d_{m2}$ 901 is calculated in advance according to the sector scan angle α.

In Step d2, referring to time-series received signals in the memory 6, a distance from the scattering point 110 to one end of the device array 30 and a distance from the scattering point 110 to another end thereof are calculated.

In Step d3, a difference between the distances determined in Step d2 is calculated.

In Step d4, the scan angle α is compared with the calculation results of Steps d1 and d3 to determine whether the difference of the distances is within the tolerance 904 of +/− several mm where $d_{m1}-d_{m2}$ 901 is a reference.

In Step d5, if the difference is determined to be within the tolerance 904 in Step d4, the signal is identified as a signal from the direction of the main lobe.

In Step d6, if the difference is determined to be outside the tolerance 904 in Step d4, the signal is identified as a signal from the direction of the side lobe.

Figure 9B:
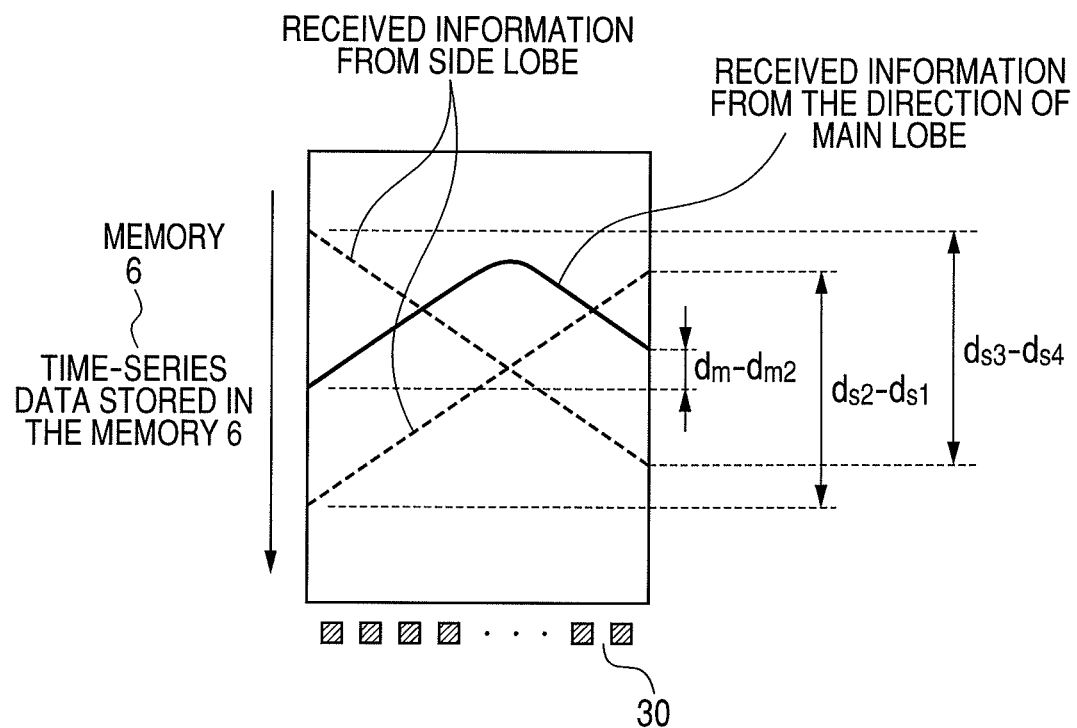
FIG. 9B is a schematic diagram illustrating information stored in the memory, which is an example for identifying the received information from the side lobe direction.

FIG. 9B is a schematic diagram illustrating pieces of information stored in time series in the memory 6 under the above-mentioned condition. As described above, the distances $d_{m1}$, $d_{m2}$ and $d_{s1}$ to $d_{s4}$ from the scattering points 110m and 110s to both ends of the transmission/reception aperture 34 are determined by calculation, and whether the scattering points 110m and 110s are at positions corresponding to the scan angle α is determined based on differences among the distances. Using the scattering point 110s not at a position corresponding to the scan angle α as information of the signal corresponding to the side lobe, the information of the signal corresponding to the side lobe is subtracted from information of received signal of the transmission/reception aperture 34. Information for image forming corresponding to a signal from the main lobe can accordingly be obtained. As a result, an artifact-reduced ultrasound image can be displayed on the display 11. Even if there is a sound-velocity distribution inside a test object 100, the information of the signal corresponding to the side lobe can be identified, and hence a system of a highly robust ultrasonograph 1 can be configured. The difference $d_{m1}-d_{m2}$ 901 of the scattering point from the direction of the main lobe is determined to be set as a reference. A received signal within the tolerance 904 of +/− several mm with respect to the reference is set as a received signal from the main lobe. Identifying received signals outside the tolerance 904 as received signals from the side lobe enables omission of calculation of $d_{s1}-d_{s2}$ 902 and $d_{s3}-d_{s4}$ 903.

In the second embodiment, to obtain information of the signal corresponding to the side lobe, distances from the scattering points 110m and 110s to both ends of the transmission/reception aperture 34 are determined. Not limited to this, however, distances from each scattering point 110 to two arbitrary points of the transmission/reception aperture 34 may be calculated. In the above-mentioned calculation, the conversion is carried out based on the distances. However, the calculation is not limited to this. For example, a method for calculation using a period of time from transmission of an ultrasound wave to reception thereof is one of effective methods. Specifically, the side lobe can be identified by using $t_{m1}-t_{m2}$, $t_{s1}-t_{s2}$, and $t_{s3}-t_{s4}$ respectively corresponding to $d_{m1}-d_{m2}$ 901, $d_{s1}-d_{s2}$ 902, and $d_{s3}-d_{s4}$ 903. A relationship between d and t is d=ct where c is a sound velocity. Normally, a value ranging from 1,530 m/s to 1,540 m/s is applied as the sound velocity c. To identify the received signal from the side lobe, the differences have been applied for the distance or time comparison method. However, the method is not limited to this. The order of the differences is not limited to the above.

The second embodiment has been directed to the sector scanning. This method is effective for other scanning systems such as a convex scanning system including the linear (scan angle α=0) system.

Third Embodiment

The first and second embodiments have been directed to the method of extracting the information of the signal corresponding to the side lobe from among the pieces of information of received signals to obtain information for image forming. The third embodiment is directed to a different calculation method for information of a signal corresponding to a side lobe.

Referring to FIG. 10, this embodiment is described as follows. FIG. 10 is a schematic diagram illustrating a configuration of an ultrasound apparatus. Differences from the configuration of the ultrasound apparatus of FIG. 3 are inclusion of an image forming region 61 and a side lobe identification region 62 in a memory 6, an interpolator 80 for extracting a side lobe, and method to identify a side lobe performed in a side lode identification device 7.

An overall signal flow in the ultrasound apparatus of FIG. 10 is described as follows. A transmission signal is transmitted from a transmission device 2 to each device of a probe 3, and an ultrasound wave is transmitted toward a test object 100. The device of the probe 3 receives an ultrasound wave reflected from the test object 100, and an analog signal processing device 4 performs filter processing or amplification for the received signal.

An ADC 5 digitizes an output from the analog signal processing device 4 to store the output in the memory 6. The memory 6 needs at least a capacity for identifying a signal from a direction of a side lobe and calculating information of the signal corresponding to the side lobe to subtract the information of the signal corresponding to the side lobe from information of received signal, and preferably stores signals of several frames. The side lobe identification device 7 identifies a signal corresponding to a signal from the side lobe among time-series data corresponding to the elements in the memory 6. Based on information of the identified side lobe, the interpolator 80 in a calculator obtains information of the signal corresponding to the side lobe. The information of the signal corresponding to the side lobe is sent to a subtracter 9. The subtracter 9 receives information of received signal necessary for image forming, and subtracts the information of the signal corresponding to the side lobe from the information of received signal to obtain information for image forming corresponding to a signal from a main lobe. A digital signal processing device 10 subjects the information to signal processing such as phase rectifying conversion, detection or logarithmic compression, and image processing, whereby an artifact-reduced ultrasound image can be displayed on a display.

Some of functions of the digital signal processing device 10, for example, a part of signal processing such as detection, may be disposed between the ADC 5 and the memory 6. FIG. 10 illustrates the system configuration mainly based on B mode displaying. However, a processing function for realizing other modes such as a doppler may be provided.

Figure 11A:
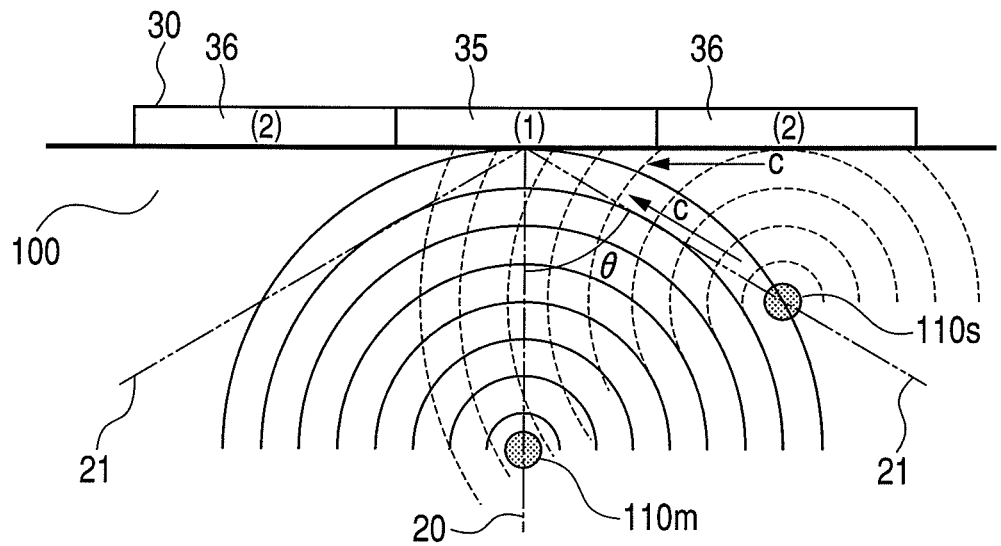
FIG. 11A is a schematic diagram illustrating a method of identifying received information from the side lobe direction.

Referring to FIG. 11A, signal processing from the memory 6 through the side lobe identification device 7 to the subtracter 9 is described in detail by taking an example of a linear probe. FIG. 11A is a schematic diagram illustrating a status of received signals from main and side lobes 20 and 21. A device array 30 includes an area 35 of devices corresponding to an aperture for transmitting/receiving beams in electronic scanning of the linear probe, and areas 36 adjacent to both sides of the transmission/reception aperture 35. In FIG. 11A, for a beam transmitted through the transmission/reception aperture 35, the main lobe 20 is sent in a direction perpendicular to the probe 3, and the side lobe 21 is generated in a predetermined angle direction from the main lobe 20. If there are scattering points 110m and 110s at the same distances from a center of the transmission/reception aperture 35 in a direction perpendicular to the probe 3 and the direction of the side lobe 21, a reflection wave from the direction of the main lobe 20 is received from the center of the transmission/reception aperture 35. Further, a reflection wave from the side lobe 21 is received from the reception aperture 36. In FIG. 11A, a solid line indicates a reflection wave from the direction of the main lobe 20, and a broken line indicates a reflection wave from the direction of the side lobe 21.

Figure 11B:
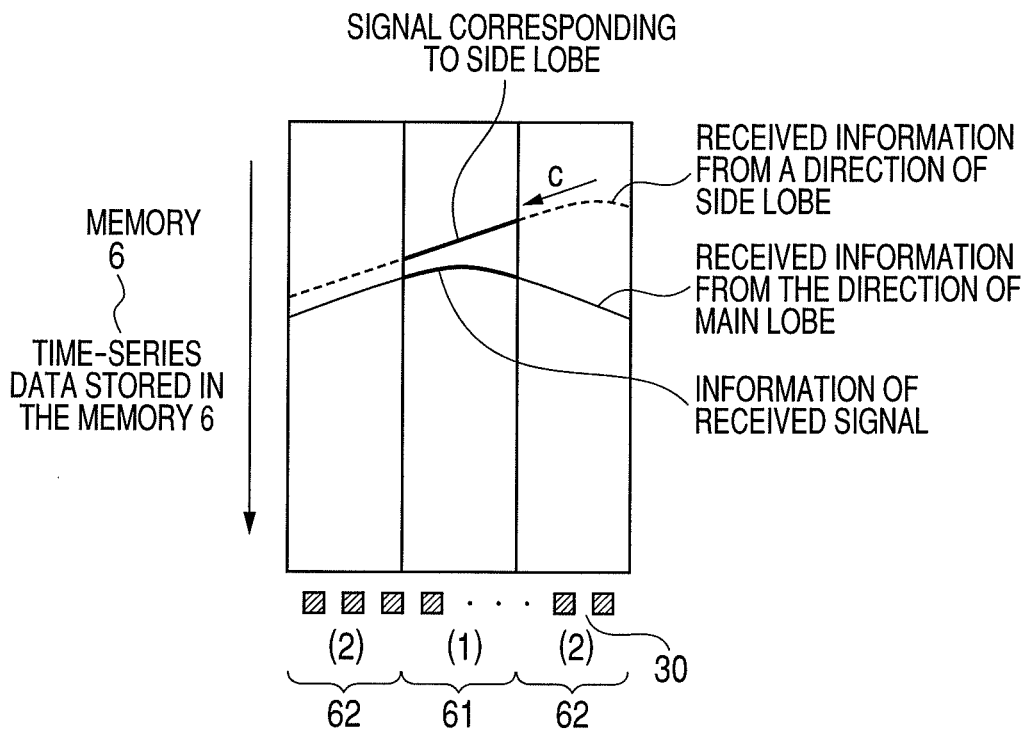
FIG. 11B is a schematic diagram illustrating the memory.
Figure 12:
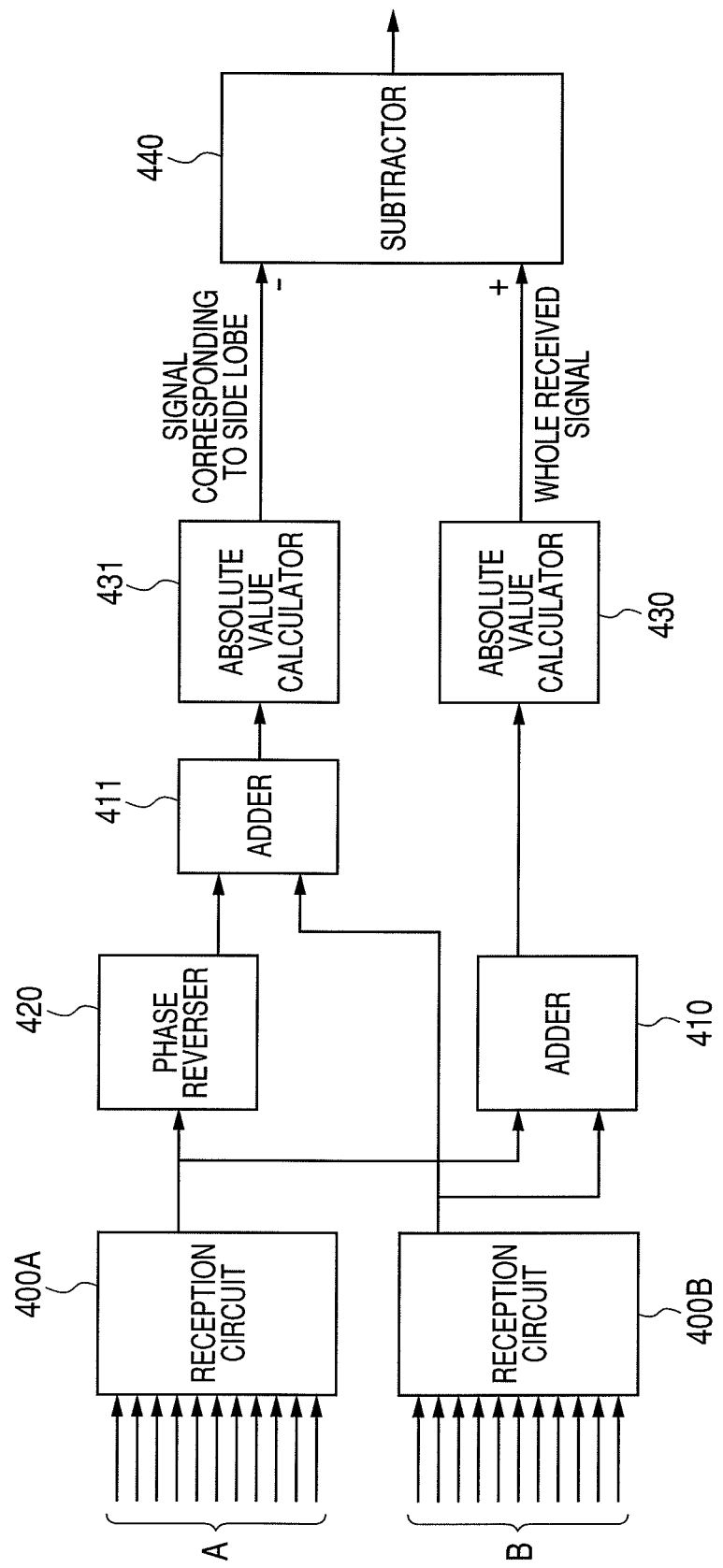
FIG. 12 is a schematic diagram illustrating a background art.

FIG. 11B is a schematic diagram illustrating the memory 6 which stores signals digitized corresponding to the devices 30 in time series. A signal first received at the reception aperture 36 to gradually move toward the transmission/reception aperture 35 is identified as signal information from the side lobe 21, and subtracting the signal information from information received at the transmission/reception aperture 35 leaves signal information from the main lobe 20.

Figure 5B:
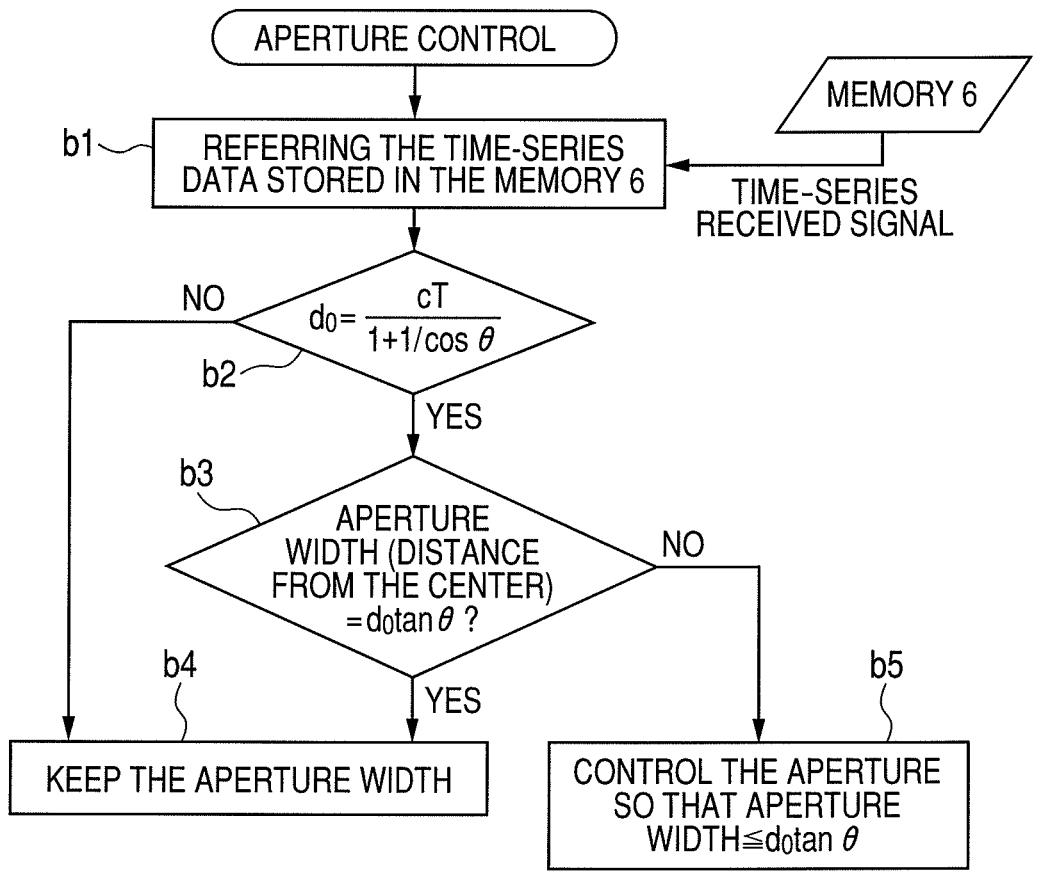
FIG. 5B is a flowchart illustrating identification of received information from a side lobe direction.
Figure 5C:
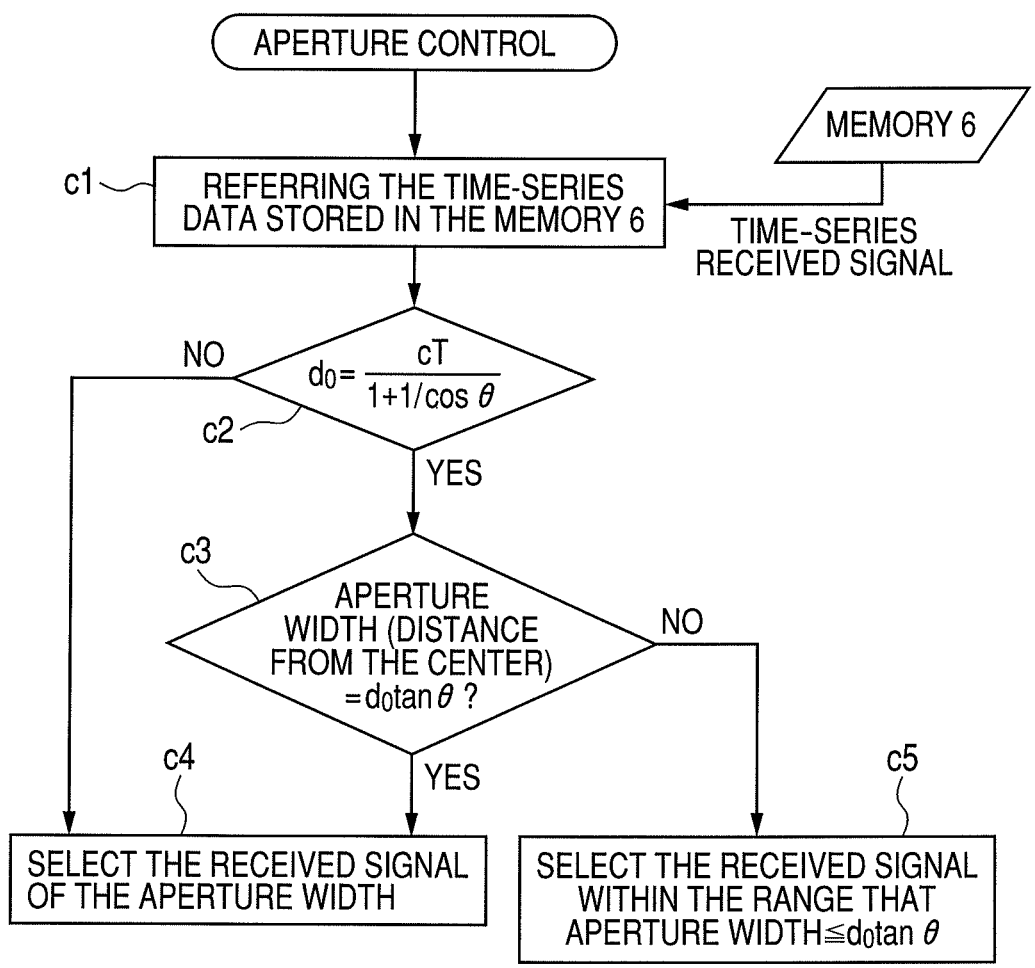
FIG. 5C is another flowchart illustrating the identification of the received information from the side lobe direction.

In FIG. 11A, an angle θ between the main and side lobes 20 and 21 is unique to the probe 3. For example, The angle θ is determined by a relationship between a pitch of the device array 30 in the probe 3 and a wavelength λ (=c/f, c: sound velocity, and f: frequency) of an ultrasound wave. A received signal from the direction of the side lobe 21 is first received through the reception aperture 36 to be received by each device at a velocity c toward the aperture 35. Thus, as illustrated in FIGS. 5A to 5C, the side lobe identification device 7 identifies the received signal as information of received signal from the side lobe 21. The identification is carried out among the time-series signals stored in the memory 6. In this case, signal information transmitted from a region (side lobe identification region 62) corresponding to the reception aperture 36 toward a region (image forming region 61) corresponding to the transmission/reception aperture 35 at the velocity c is identified.

For the identification information of the identified side lobe, an interpolation signal received through the transmission/reception aperture 35 from the side lobe identification region 62 is interpolated by the interpolator 80 to calculate information of the signal corresponding to the side lobe. More specifically, the signal may be extrapolated from the side lobe identification region 62 to the image forming region 61 at the sound velocity c. Subtracting the information of the signal corresponding to the side lobe from information for image forming of the image forming region 61 enables obtaining of signal information of the signal corresponding to a signal from the main lobe 20.

The aforementioned method enables obtaining of information of the signal corresponding to a signal from the main lobe 20. As described in the first embodiment, aperture control has to be performed according to depths of the scattering points 110m and 110s. In other words, an aperture at least during reception among the transmission/reception apertures 35 is controlled according to a position of the scattering point 110. When the scattering point 110 is close to the device array 30, the transmission/reception aperture 35 may be narrowed while the reception aperture 36 may be widened so that the reception aperture 36 can receive a signal from the direction of the side lobe 21 before the transmission/reception aperture 35. An aperture width is oscillators within a range of $d_0 \cdot \tan \theta$ from an aperture center, where $d_0$ is a distance from the oscillator from the aperture center to an object with respect to a depth direction of the inside of the test object. Thus, a received signal from the side lobe 21 can be received from the reception aperture 36, and information of the signal corresponding to the side lobe can be obtained by the method described thus far. For the transmission/reception aperture 35, an aperture has to be narrowed at least during reception, and there is no limit on aperture control during transmission.

According to the third embodiment described above, information of the signal corresponding to the side lobe is obtained from the side lobe identification region 62 by extrapolation without extracting the information of the signal corresponding to the side lobe from the information of received signal unlike the first and second embodiments. Thus, for an aperture necessary for reception, not only the transmission/reception aperture 35 but also the reception aperture 36 are necessary. Higher resolution can be expected because a signal is obtained from a wider reception aperture.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-163641, filed Jun. 23, 2008, and 2009-097224, filed Apr. 13, 2009, which are hereby incorporated by reference herein in their entirety.

The invention claimed is:

1. An ultrasound apparatus comprising:
    an ultrasound probe which comprises multiple oscillators for generating and detecting an ultrasound wave;
    a control unit for controlling the ultrasound probe to generate an ultrasound wave as a main lobe and to detect an ultrasound wave from a focusing position in a direction of the main lobe; and
    a storage unit for storing intensities of ultrasound waves detected by the multiple oscillators as time-series signals, wherein:
    among the multiple oscillators, oscillators included within a distance of $d_0 \cdot \tan \theta$ or less from a center oscillator of an aperture are selected as a reception aperture, where, when the direction of the main lobe is substantially perpendicular to the aperture of the ultrasound probe, with respect to the direction substantially perpendicular, $d_0$ is a distance from the aperture to an object positioned in a direction of a side lobe, and $\theta$ is an angle between the main lobe and the side lobe; and
    among the signals stored in time-series in the storage unit, a signal received in time order from an end of the reception aperture to another end is subtracted from the signals stored in time-series in the storage unit.

2. An ultrasound apparatus according to claim 1, wherein the reception aperture receives, after the selection of the oscillators included within a range of $d_0 \cdot \tan \theta$ from the center oscillator of the aperture, the time-series signals by the selected oscillators.

3. An ultrasound apparatus according to claim 1, wherein the reception aperture selects, after obtaining of the time-series signals by the multiple oscillators, a signal received by the oscillators included within a range of $d_0 \cdot \tan \theta$ from the center oscillator of the aperture among the signals stored in the storage unit.

4. An ultrasound apparatus according to claim 1, wherein when the direction of the main lobe is a direction of angle $\alpha$ with respect to the direction substantially perpendicular, by using the signals stored in time-series in the storage unit, a difference between a distance from an object to one end of the multiple oscillators and a distance from the object to another end of the multiple oscillators is calculated;
    when the calculated difference exceeds a reference width given based on the angle $\alpha$, the stored signal is identified as a signal from a direction of a side lobe; and
    the identified signal from the direction of the side lobe is subtracted from the signals stored in time-series in the storage unit.

5. An ultrasound apparatus according to claim 1, wherein, among the signals stored in time-series in the storage unit, the signal received in time order from an end of the reception aperture to another end is identified as a signal reflected from an object positioned in a direction of the side lobe; and
    the identified signal from the side lobe is subtracted from the signal stored in time-series in the storage unit.

6. A method of controlling an ultrasound apparatus comprising an ultrasound probe which comprises multiple oscillators for generating and detecting an ultrasound wave, comprising:
    generating a first ultrasound wave as a main lobe;
    controlling the ultrasound apparatus to detect an ultrasound wave from a focusing position in a direction of the main lobe;
    storing intensities of ultrasound waves detected by the multiple oscillators as time-series signals, wherein, among the multiple oscillators, oscillators included within a distance of $d_0 \cdot \tan \theta$ or less from a center oscillator of an aperture are selected as a reception aperture, where, with respect to a direction substantially perpendicular to the aperture of the ultrasound probe, $d_0$ is a distance from the aperture to an object positioned in a direction of a side lobe, and θ is an angle between the main lobe and the side lobe;

calculating a time period after a second ultrasound wave is generated as a side lobe until the second ultrasound wave that has been reflected on an object is detected by each of the multiple oscillators, wherein, among the signals stored in time-series, a signal received in order from an end of the reception aperture to another end is identified as a signal reflected from the object positioned in the direction of the side lobe; and an intensity of the ultrasound wave, which has been reflected on the object and detected by the each of the multiple oscillators, and which is obtained by using information stored during the calculated time period, is subtracted from the signals stored in time series, wherein the identified signal from the side lobe is subtracted from the stored time-series signals.

7. A method of controlling an ultrasound apparatus comprising an ultrasound probe which comprises multiple oscillators for generating and detecting an ultrasound wave, comprising:

generating a first ultrasound wave as a main lobe;

controlling the ultrasound apparatus to detect an ultrasound wave from a focusing position in a direction of the main lobe;

storing intensities of ultrasound waves detected by the multiple oscillators as time-series signals;

calculating a time period after a second ultrasound wave is generated as a side lobe until the second ultrasound wave that has been reflected on an object is detected by each of the multiple oscillators, wherein a difference, when the ultrasound probe generates the main lobe in a direction of an angle α with respect to a direction substantially perpendicular to the multiple oscillators, between a distance from an object to one end of the multiple oscillators and a distance from the object to another end of the multiple oscillators is calculated by using the signal stored in time-series, and when the calculated difference exceeds a reference width given based on the angle α, the stored signal is identified as a signal from a direction of the side lobe; and an intensity of the ultrasound wave, which has been reflected on the object and detected by the each of the multiple oscillators, and which is obtained by using information stored during the calculated time period, is subtracted from the signals stored in time series, wherein the identified signal from the side lobe is subtracted from the stored time-series signals.

8. An ultrasound apparatus comprising:

an ultrasound probe which comprises multiple oscillators for generating and detecting an ultrasound wave;

a control unit for controlling the multiple oscillators, to generate ultrasound waves from at least two oscillators, as transmission apertures, of the multiple oscillators to form a main lobe in a direction substantially perpendicular to the ultrasound probe, and to detect reflection waves of the ultrasound waves by at least two oscillators, as reception apertures, of the multiple oscillators;

a storage unit for storing intensities of ultrasound waves detected by the oscillators as the reception apertures as time-series signals;

a subtraction unit for subtracting, signals corresponding to signals between those signals output in time order by an oscillator at an end of the reception aperture and signals output in time order by an oscillator at another end of the reception aperture, which are received in time order, from the signals corresponding to the reception apertures which are stored in time-series in the storage unit; and a signal processing unit for generating an ultrasound image based on the time-order signals from which the signals received in time-order were subtracted by the subtraction unit.

* * * * *